US011745826B2

(12) United States Patent
Xie et al.

(10) Patent No.: US 11,745,826 B2
(45) Date of Patent: Sep. 5, 2023

(54) INTEGRATED FLYWHEEL WITH TOGETHER CYLINDERS AND MANUFACTURING METHOD THEREFOR

(71) Applicant: HUNAN SROAD TECHNOLOGY CO., LTD., Hunan (CN)

(72) Inventors: Tao Xie, Hunan (CN); Xiaoran Zheng, Hunan (CN); Jizhou Ou, Hunan (CN); Hui Xue, Hunan (CN); Lang Wang, Hunan (CN); Yaoyao Huang, Hunan (CN)

(73) Assignee: HUNAN SROAD TECHNOLOGY CO., LTD., Hunan (CN)

( * ) Notice: Subject to any disclaimer, the term of this patent is extended or adjusted under 35 U.S.C. 154(b) by 743 days.

(21) Appl. No.: 16/766,632

(22) PCT Filed: Dec. 18, 2017

(86) PCT No.: PCT/CN2017/116891
§ 371 (c)(1),
(2) Date: Jul. 22, 2020

(87) PCT Pub. No.: WO2019/100480
PCT Pub. Date: May 31, 2019

(65) Prior Publication Data
US 2021/0009233 A1 Jan. 14, 2021

(30) Foreign Application Priority Data
Nov. 22, 2017 (CN) .......................... 201711173372.4

(51) Int. Cl.
*B62M 9/12* (2006.01)
*B60B 27/02* (2006.01)
(52) U.S. Cl.
CPC ............. *B62M 9/12* (2013.01); *B60B 27/023* (2013.01); *B60Y 2200/13* (2013.01)

(58) Field of Classification Search
CPC ..... B62M 9/12; B60B 27/023; B60Y 2200/13
(Continued)

(56) References Cited

U.S. PATENT DOCUMENTS

| 4,380,445 | A | * | 4/1983 | Shimano | ................. | B62M 9/105 |
| | | | | | | 474/144 |
| 5,503,600 | A | * | 4/1996 | Berecz | .................... | F16H 55/30 |
| | | | | | | 474/160 |

(Continued)

FOREIGN PATENT DOCUMENTS

| CN | 2181470 Y | 11/1994 |
| CN | 1490213 A | 4/2004 |

(Continued)

OTHER PUBLICATIONS

International Search Report (in English and in Chinese) issued in PCT/CN2017/116891, dated Aug. 20, 2018, 11 pages provided.

*Primary Examiner* — Gene O Crawford
*Assistant Examiner* — Emily R Kincaid
(74) *Attorney, Agent, or Firm* — HAMRE, SCHUMANN, MUELLER & LARSON, P.C.

(57) ABSTRACT

The present disclosure provides an integrated flywheel with shared cylinders and a manufacturing method therefor, comprising gear rings and support portions comprising a plurality of bridge portions with a spoke and a cylinder. Between adjacent bridge portions, the first spoke overlaps one end of a cylinder on a next-stage support portion to form a first overlap joint, one end of the first cylinder overlaps an inner side of the first spoke, and the other end of the first cylinder overlaps and is fixed with an outer side of the second spoke to form a second overlap joint. A first gear ring with a greater diameter is fixed at the first overlap joints, and a third gear ring with a less diameter is fixed at the second overlap joints.

(Continued)

The integrated flywheel has advantages of low mass, good manufacturability and high production efficiency.

10 Claims, 2 Drawing Sheets

(58) Field of Classification Search
USPC .......................................................... 474/160
See application file for complete search history.

(56) References Cited

U.S. PATENT DOCUMENTS

| | | | |
|---|---|---|---|
| 8,360,911 B2* | 1/2013 | Braedt | B62M 9/10 474/164 |
| 9,260,158 B2* | 2/2016 | Braedt | B62M 9/10 |
| 2009/0243250 A1* | 10/2009 | Chiang | B62M 9/10 280/260 |
| 2012/0244976 A1 | 9/2012 | Lin | |
| 2016/0272002 A1* | 9/2016 | Earle | B60B 1/041 |

FOREIGN PATENT DOCUMENTS

| | | |
|---|---|---|
| CN | 101513918 A | 8/2009 |
| CN | 102556274 A | 7/2012 |
| CN | 107933812 A | 4/2018 |
| CN | 207565776 U | 7/2018 |
| CN | 207565777 U | 7/2018 |

* cited by examiner

INTEGRATED FLYWHEEL WITH TOGETHER CYLINDERS AND MANUFACTURING METHOD THEREFOR

TECHNICAL FIELD

The present disclosure relates to a variable speed component for bicycle and in particular to an integrated flywheel with together cylinders and a manufacturing method therefor.

BACKGROUND

With the progress of society, today's transportation vehicles are increasingly demanding light weight and high strength. At present, the weight of bicycles is usually reduced by weight-reducing materials and structures, and weight-reducing is based on the premise that strength and rigidity are adequately guaranteed. Especially for sports bicycles, they have higher requirements on strength and rigidity of the variable speed sprocket. The variable speed sprocket is one of the most important parts in bicycles. As the basic performance requirement, at given mass, the higher the strength and rigidity, the better.

The variable speed sprocket is structured to have multiple layers of gear rings. There are usually two typical structures. In one structure, represented by the product from SHIMANO, stamped gear rings are superposed together by riveting to form a variable speed sprocket. In the other structure, represented by the integrated flywheel from SRAM, a tapered hollow body is used as a support structure. The former product is often low in rigidity and strength, weak in bearing capacity, and heavy in mass, although relatively good in manufacturability. The latter product is a tapered hollow body structure, and most of the gear rings are usually processed from one piece of material, so that it has high strength and rigidity. However, in this design, each layer of gear rings must correspond to a cylinder coaxial with the axis of rotation. This structure has poor manufacturability when the difference in the number of teeth of two adjacent gear rings is small, which is not conducive to processing weight-reducing holes and positive and negative teeth, and also results in high mass. In addition, as disclosed in the Patent 200910004713.4, due to the need for product weight reduction, a large number of weight-reducing grooves are formed in the cylinders and the spokes at parts corresponding to the teeth to form so-called bridge portions which are actually rod-shaped cantilever beams. In order to form this structure, the tool needs to go deeper during processing, and because the space here is small, the space for the tool to advance and retreat is limited, which easily affects the processing efficiency and processing quality.

SUMMARY

To solve the above-mentioned technical problems, the present disclosure provides an integrated flywheel with shared cylinders which has low mass, good manufacturability and high production efficiency, and a method for manufacturing the integrated flywheel with shared cylinders.

The present disclosure is realized by the following technical solutions.

An integrated flywheel with shared cylinders is provided, comprising a plurality of gear rings that are different in size and are used for receiving a chain and transferring a circumferential force from the chain to a hub of a rear wheel of a bicycle, and a plurality of annular support portions that are used to fix adjacent gear rings, the chain being capable of moving from one gear ring to another gear ring via a variable speed mechanism; each stage of support portion comprises a plurality of bridge portions which are located in a same plane and each of which is composed of a spoke and a cylinder, a first bridge portion on a first-stage support portion comprising a first spoke and a first cylinder, a second bridge portion on another-stage support portion comprising a second spoke and a second cylinder; between adjacent bridge portions, the first spoke overlaps one end of a cylinder of a bridge portion on a next-stage support portion to form a first overlap joint, one end of the first cylinder overlaps an inner side of the first spoke, and the other end of the first cylinder overlaps and is fixed with an outer side of the second spoke to form a second overlap joint; and a first gear ring with a greater diameter is fixed at the first overlap joints, a third gear ring with a smaller diameter is fixed at the second overlap joints; and at least one layer of second gear ring is arranged on the first cylinder in a radial direction.

Preferably, the outer diameter of the support portion is equal to the inner diameter of a corresponding gear ring, and any two of the support portions are similar in shape; a multi-stage stepped pyramidal member is formed by successively overlapping the spokes and the cylinders of all the support portion, and a corresponding gear ring is fixed on the pyramidal member to form a flywheel or a part of the flywheel.

Preferably, there are reverse L-shaped gaps among the plurality of first bridge portions; the gap extends, from a plane of the second spoke overlapped by the third gear ring with a smaller diameter and along a direction of the first cylinder, upwards through the second gear ring to the first spoke, and extends up to the root of the first gear ring with a greater diameter along the first spoke.

Preferably, the number m of the gaps and the number of teeth Z on the overlapped third gear ring meet the following relationship: $Z-(0.5*Z+1) \leq m \leq Z+(0.5*Z+1)$, where both m and z are integers.

Preferably, the spokes, the cylinders and the gear rings are made of an integral piece of material.

Preferably, a point where the second gear ring is fixed with the first cylinder is a third overlap joint, the second gear ring is located between the first gear ring and the third gear ring, and the diameters of the third gear ring, the second gear ring and the first gear ring gradually increase to form a pyramidal multi-layer sprocket.

Preferably, when there are more than two second gear rings on a same first cylinder, the diameter relationship of the second gear rings should conform to the pyramidal multi-layer sprocket, and a plurality of third overlap joints are uniformly distributed on the first cylinder.

Preferably, when there is only one second gear ring on a same first cylinder, the third overlap joint is located in a central region of the first cylinder.

Preferably, a point where the second gear ring is fixed with the first cylinder is a third overlap joint; third overlap joints, in a same horizontal plane, of a plurality of first cylinders are successively connected to form a defined region; and a part of the second gear ring, which is located between adjacent third overlap joints, is recessed outward away from the defined region to form a weight-reducing groove.

A method for manufacturing an integrated flywheel with shared cylinders, comprising:

manufacturing a semi-finished product by turning a solid blank or a bowl-shaped forging blank;

milling a corresponding support portion structure from the inside of the semi-finished product; forming all tooth profiles and particular tooth profiles by milling; thermally treating to obtain an integrated product with high strength, high tenacity and high wear resistance; and performing surface treatment.

Beneficial Effects

Compared with the prior art, the present disclosure saves a layer of support portions by providing at least one layer of second gear ring on the cylinders. This simplifies the structure and reduces the mass. Especially when workpieces with small difference in the number of teeth of adjacent gear rings are to be manufactured, this structure effectively increases the width between the spokes, and the distance between the spokes increases with the increase in height of the cylinders, thereby effectively increasing the space available for the tool. In turn, the tool diameter can be more flexibly selected to allow better manufacturability, better processing quality and high processing efficiency.

BRIEF DESCRIPTION OF THE DRAWINGS

The specific implementations of the present disclosure will be further described in detail below with reference to the accompanying drawings, wherein.

DETAILED DESCRIPTION

Figure 1:
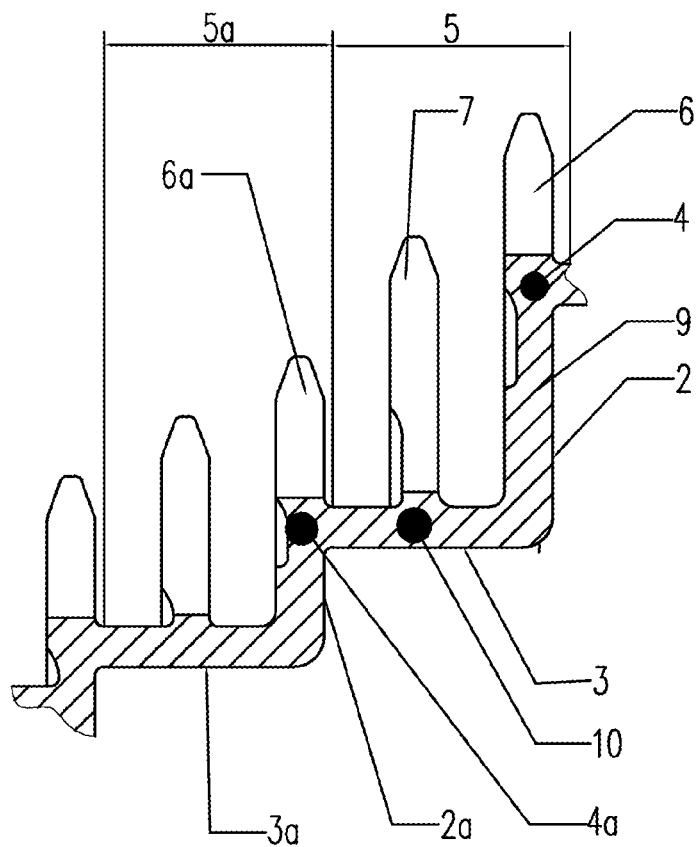
FIG. 1 is a partial schematic view of the relationship between bridge portions and gear rings.

For ease of understanding, the components in this embodiment, such as the first bridge portion 5 and the second bridge portion 5a, the first spoke 2 and the second spoke 2a, the first cylinder 3 and the second cylinder 3a, and the first gear ring 6 and the third gear ring 6a, etc., have the same or similar shapes, structures, and sizes, and should be representative when the repeating members are expanded accordingly.

Figure 2:
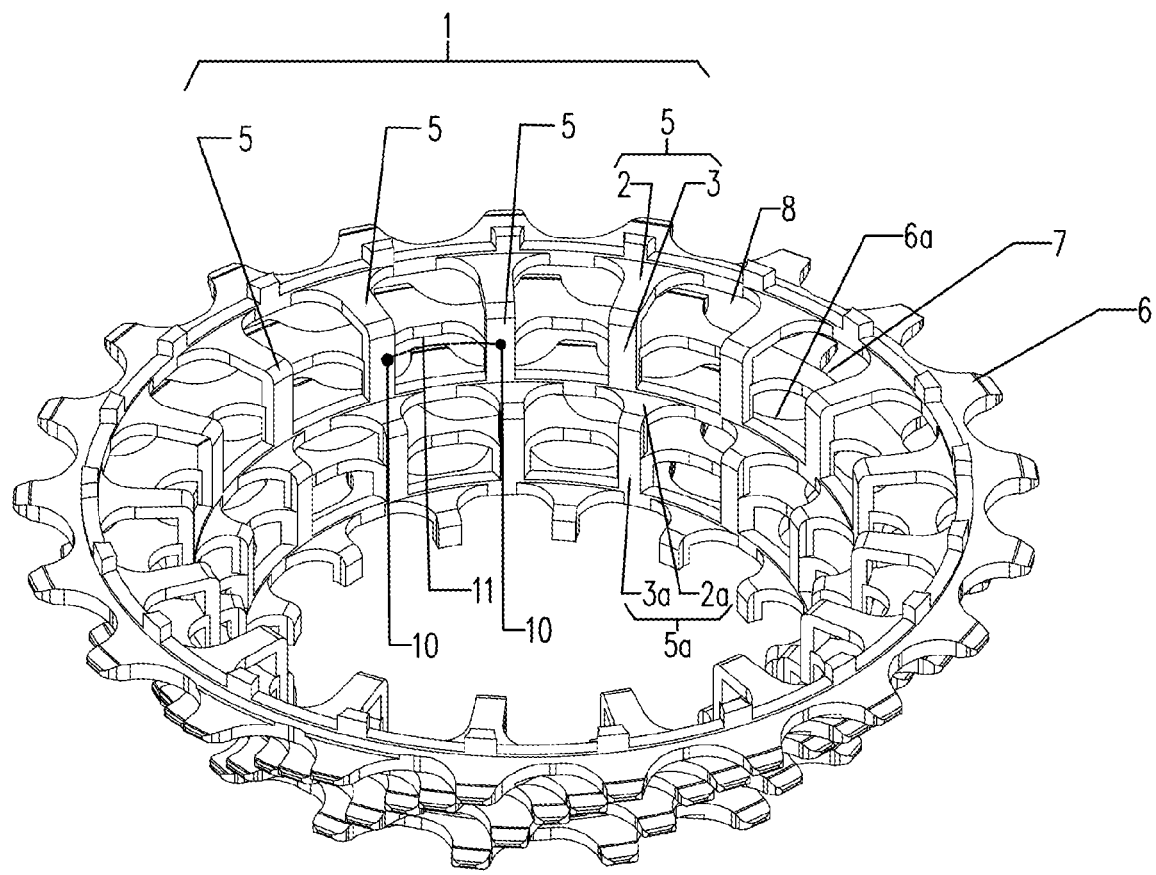
FIG. 2 is a three-dimensional schematic view of one section of the flywheel.

As shown in FIGS. 1 and 2, an integrated flywheel with shared cylinders is provided, comprising a plurality of gear rings that are different in size and are used for receiving a chain and transferring a circumferential force from the chain to a hub of a rear wheel of a bicycle, and a plurality of annular support portions that are used to fix adjacent gear rings, the chain being capable of moving from one gear ring to another gear ring via a variable speed mechanism; each stage of support portion comprises a plurality of bridge portions which are located in a same plane and each of which is composed of a spoke and a cylinder, a first bridge portion 5 on a first-stage support portion 1 comprising a first spoke 2 and a first cylinder 3, a second bridge portion 5a on another-stage support portion comprising a second spoke 2a and a second cylinder 3a, and so on; the first gear ring 6 is arranged at an outside end of the first spoke 2 in a radial direction; between the adjacent first bridge portion 5 and second bridge portion 5a, the first spoke 2 overlaps one end of a cylinder of a bridge portion on a next-stage support portion to form a first overlap joint 4, one end of the first cylinder 3 overlaps an inner side of the first spoke 2, and the other end of the first cylinder 3 overlaps and is fixed with an outer side of the second spoke 2a to form a second overlap joint 4a; and a first gear ring 6 with a greater diameter is fixed at the first overlap joints 4, a third gear ring 6a with a smaller diameter is fixed at the second overlap joints 4a; and at least one layer of second gear ring 7 is arranged on the first cylinder 3 in the radial direction. Considering the overall shape, size and weight of the flywheel, it is preferable to add one to four layers of second gear rings 7 on the first cylinder 3. Too many layers of second gear rings 7 will affect the support strength and processing technology. A point where the second gear ring 7 is fixed with the first cylinder 3 is a third overlap joint 10. For ease of description and understanding, although the second gear rings 7 do not correspond to a separate support portion, a support member is still assumed in this paragraph and below. The support member is a first-stage support portion or a similar structure. The support member is a support and fixation structure necessary for each layer of gear ring when this design is not adopted. With this design, at least two layers of gear rings are together designed on a same support portion. Accordingly, the original structure where one layer of gear ring corresponds to one layer of support member becomes a structure where two or more layers of gear rings share one layer of support portion, thereby eliminating the support member that would otherwise correspond to the second gear rings 7 and thus simplifying the structure. Although the height of the first cylinder 3 needs to be increased since a plurality of layers of gear rings are combined and the distance between the gear rings is constant, the first cylinder 3 can also be thickened. The thickened first cylinder 3 has an increased mass. However, compared to the original structure where one layer of gear ring corresponds to a support member, the total mass of the flywheel is reduced after omitting a layer of support member. And, due to the thickening, the circumferential rigidity and torsion resistance of the first cylinder 3 are increased. Meanwhile, due to the increased height of the first cylinder 3, the distance between adjacent first spoke 2 and second spoke 2a is greatly increased. In the production of gear rings, especially when the difference in the number of teeth of the gear rings is small, the space available for the tool increases. A more suitable tool and a more appropriate distance for the tool to advance and retreat may be selected according to actual requirements, finally providing a significantly optimized manufacturability in the region between the first cylinders 3. And, the quality is better and the processing efficiency is higher.

As a preferred implementation, as shown in FIGS. 1 and 2, the outer diameter of the support portion is equal to the inner diameter of a corresponding gear ring, thus a multi-stage stepped pyramidal member 9 is formed by successively overlapping all the spokes and the cylinders of the support portion, and a corresponding gear ring is fixed on the pyramidal member 9 to form a flywheel or a part of the flywheel. The gear ring can be integrally connected with the pyramidal member 9; or, the gear ring and the pyramidal member 9 can be processed into two separate modules which are then connected as a non-detachable unit through subsequent processes. It is recommended to manufacture the spokes, the cylinders and the gear rings from an integral piece of material. In this way, the connection between different components becomes more secure; the circumferential force transferred from the chain is transformed to a torsional force by the first gear ring 6, which works on the overlap joints (not shown), and which is then transferred to the first spokes 2; the first spoke 2 then transfers the torque to the first cylinder 3; the first cylinder 3 transfers the torque to the first overlap joint 4 and then the torque transitions to the first spoke 2 of the next-stage support portion, and so on, and finally to the support portion with the smallest diameter (not shown). The support portion with the smallest diameter is connected with the hub of the rotating shaft on the bicycle so that, even the support portion is not provided with a hub, the flywheel can transfer the whole torsional force and connect with the hub.

As a preferred implementation, as shown in FIG. 2, there are reverse L-shaped gaps 8 among the first bridge portions 5; the gap 8 extends, from a plane of the second spoke 2a of the second bridge portion 5a overlapped by the third gear ring 6a with a smaller diameter and along a direction of the first cylinder 3, upwards through the second gear ring 7 to the first spoke 2, and extends up to the root of the first gear ring 6 with a greater diameter along the first spoke 2. The gap 8 is helpful for draining mud from the flywheel during its operation, and the arrangement of the gaps 8 is beneficial for the reduction of the total mass of the flywheel. The number m of the gaps 8 and the number of teeth Z on the overlapped third gear ring 6a meet the following relationship: $Z-(0.5*Z+1) \leq m \leq Z+(0.5*Z+1)$, where both m and z are integers. For example, when the number of teeth Z on the third gear ring 6a is 20, the number m of the gaps 8 is any integer within the range of 20±11, which means that the first cylinder 3 can be aligned or misaligned to the center of teeth of the third gear ring 6a with a smaller diameter. When the number of teeth Z is 20 and the number m of the gaps 8 is 20, the difference between the two is 0, the first cylinder 3 is aligned to the center of teeth of the third gear ring 6a, and the uniformity of rigidity is better. When the difference between the two is not 0, the first cylinder 3 is offset from the center of teeth of the third gear ring 6a by a certain angle, which can better meet the manufacturability, high strength and high rigidity. Since the width of the gap 8 is determined by adjacent first cylinders 3, the number of the first cylinders 3 on the third gear ring 6a can be adjusted as needed, thereby affecting the width and number of the gaps 8. With such differential arrangement, it is easy to process.

As a preferred implementation, as shown in FIGS. 1 and 2, the second gear ring 7 is located between the first gear ring 6 with a greater diameter and the third gear ring 6a with a smaller diameter, and the diameters of the third gear ring 6a, the second gear ring 7 and the first gear ring 6 gradually increase to form a pyramidal multi-layer sprocket. It is convenient to adjust the chain for the first gear ring 6 and the second gear ring 7 on a same first cylinder 3 as needed. Meanwhile, the pyramidal multi-layer sprocket and the pyramidal member 9 should be matched in their inclination directions, to avoid the waste of material caused by increasing the diameter of the gear ring on a support portion 1a with a smaller diameter.

As a preferred implementation, when there are two or more second gear rings 7 on a same first cylinder 3, the diameter relationship of the second gear rings 7 should conform to the pyramidal multi-layer sprocket, and a plurality of third overlap joints 10 are uniformly distributed on the first cylinder 3. In this way, the distance between a plurality of second gear rings 7, and the distance between the second gear rings located on two lateral edges and the third gear rings 6a and thus the first gear rings 6 are appropriate, thereby meeting the need of speed change and making the production convenient.

As a preferred implementation, as shown in FIG. 1, when there is only one second gear ring 7 on a same first cylinder 3, the third overlap joint 10 is located in a central region of the first cylinder 3. In this way, the distance among the third gear rings 6, the second gear rings 7 and the first gear rings 6 is appropriate, thereby bringing convenience to the speed change and the production.

As a preferred implementation, as shown in FIG. 2, for ease of understanding, it is defined that third overlap joints 10, in a same horizontal plane, of a plurality of first cylinders 3 on a support portion at a same stage are successively connected to form a defined region; and a part of the second gear ring 7, which is located between adjacent third overlap joints 10, is recessed outward away from the defined region to form a weight-reducing groove 11. The weight-reducing groove 11 is preferably of an arc shape or half of a square shape with arc-shaped transitions on both sides. Since the height of the first cylinder 3 is increased, the weight-reducing groove 11 can be formed on the second gear ring 7 from the inside of the tapered structure as needed. It is to be noted that the weight-reducing groove 11 should not be near the third overlap joint 10. The purpose of the weight-reducing grooves 11 is to reduce the mass of the second gear ring 7 and thus reduce the overall mass of the flywheel. Meanwhile, since the connection of the third overlap joints 10 is not affected by the machining, the rigidity and torsion resistance of the second gear ring 7 and the combined first cylinders 3 are not reduced.

A method for manufacturing an integrated flywheel with shared cylinders is provided, comprising:

manufacturing a semi-finished product by turning a solid blank or a bowl-shaped forging blank; milling a corresponding support portion structure from the inside of the semi-finished product; forming all tooth profiles and particular tooth profiles by milling; thermally treating to obtain an integrated product with high strength, high tenacity and high wear resistance; and performing surface treatment.

The above embodiments are merely used to illustrate the technical solutions of the present disclosure, rather than limiting the present disclosure. Any modification or equivalent replacement without departing from the spirit and scope of the present disclosure should be included within the scope of the technical solutions of the present disclosure.

The invention claimed is:

1. An integrated flywheel with shared cylinders, comprising a plurality of gear rings that are different in size and are used for receiving a chain and transferring a circumferential force from the chain to a hub of a rear wheel of a bicycle, and a plurality of annular support portions that are used to fix adjacent gear rings, the chain being capable of moving from one gear ring to another gear ring via a variable speed mechanism, wherein each stage of support portion comprises a plurality of bridge portions which are located in a same plane and each of which is composed of a spoke and a cylinder, a first bridge portion on a first-stage support portion comprising a first spoke and a first cylinder, a second bridge portion on another-stage support portion comprising a second spoke and a second cylinder;

between adjacent bridge portions, the first spoke overlaps one end of a cylinder of a bridge portion on a next-stage support portion to form a first overlap joint, one end of the first cylinder overlaps an inner side of the first spoke, and the other end of the first cylinder overlaps and is fixed with an outer side of the second spoke (2a) to form a second overlap joint; and a first gear ring with a greater diameter is fixed at the first overlap joint, a third gear ring with a smaller diameter is fixed at the second overlap joint; and at least one layer of second gear ring is arranged on the first cylinder in the radial direction.

2. The integrated flywheel with shared cylinders according to claim 1, wherein the outer diameter of the support portion is equal to the inner diameter of a corresponding gear ring, and any two of the support portions are similar in shape; a multi-stage stepped pyramidal member is formed by successively overlapping all the spokes and the cylinders of the support portions, and a corresponding gear ring is fixed on the pyramidal member to form a flywheel or a part of the flywheel.

3. The integrated flywheel with shared cylinders according to claim 1, wherein there are reverse L-shaped gaps among the plurality of first bridge portions; the gap extends, from a plane of the second spoke overlapped by the third gear ring with a smaller diameter and along a direction of the first cylinder, upwards through the second gear ring to the first spoke, and extends up to the root of the first gear ring with a greater diameter along the first spoke.

4. The integrated flywheel with shared cylinders according to claim 3, wherein the number m of the gaps and the number of teeth Z on the overlapped third gear ring meet the following relationship: $Z-(0.5*Z+1) \leq m \leq Z+(0.5*Z+1)$, where both m and z are integers.

5. The integrated flywheel with shared cylinders according to claim 1, wherein the spokes, the cylinders and the gear rings are made of an integral piece of material.

6. The integrated flywheel with shared cylinders according to claim 1, wherein a point where the second gear ring is fixed with the first cylinder is a third overlap joint, the second gear ring is located between the first gear ring and the third gear ring, and the diameters of the third gear ring, the second gear ring and the first gear ring gradually increase to form a pyramidal multi-layer sprocket.

7. The integrated flywheel with shared cylinders according to claim 6, wherein, when there are more than two second gear rings on a same first cylinder, the diameter relationship of the second gear rings should conform to the pyramidal multi-layer sprocketchainmulti-layer sprocket, and a plurality of third overlap joints are uniformly distributed on the first cylinder.

8. The integrated flywheel with shared cylinders according to claim 6, wherein when there is only one second gear ring on a same first cylinder, the third overlap joint is located in a central region of the first cylinder.

9. The integrated flywheel with shared cylinders according to claim 1, wherein a point where the second gear ring is fixed with the first cylinder is a third overlap joint; third overlap joints, in a same horizontal plane, of a plurality of first cylinders are successively connected to form a defined region; and a part of the second gear ring, which is located between adjacent third overlap joints, is recessed outward away from the defined region to form a weight-reducing groove.

10. A method for manufacturing an integrated flywheel with shared cylinders according to claim 1, comprising:
   manufacturing a semi-finished product by turning a solid blank or a bowl-shaped forging blank;
   milling a corresponding support portion structure from the inside of the semi-finished product;
   forming all tooth profiles and particular tooth profiles by milling;
   thermally treating to obtain an integrated product with high strength, high tenacity and high wear resistance; and
   performing surface treatment.

* * * * *